US009915356B2

(12) United States Patent
Chang et al.

(10) Patent No.: US 9,915,356 B2
(45) Date of Patent: Mar. 13, 2018

(54) VALVE APPARATUS FOR VEHICLE

(71) Applicant: INZI CONTROLS CO. LTD.,
Siheung-si, Gyeonggi-do (KR)

(72) Inventors: Seok Yoon Chang, Suwon-si (KR); Jun Woo Kim, Yongin-si (KR); Seo Kyu Kim, Yeonsu-gu (KR); Jae Young Son, Gunpo-si (KR); Chang Hyun Park, Yongin-si (KR); Dong June Kang, Namdong-gu (KR)

(73) Assignee: INZI CONTROLS CO. LTD., Siheung-si (KR)

( * ) Notice: Subject to any disclaimer, the term of this patent is extended or adjusted under 35 U.S.C. 154(b) by 0 days.

(21) Appl. No.: 14/413,267

(22) PCT Filed: Jul. 2, 2014

(86) PCT No.: PCT/KR2014/005886
§ 371 (c)(1),
(2) Date: Jan. 7, 2015

(87) PCT Pub. No.: WO2015/182813
PCT Pub. Date: Dec. 3, 2015

(65) Prior Publication Data
US 2017/0067565 A1    Mar. 9, 2017

(30) Foreign Application Priority Data

May 26, 2014  (KR) .................. 10-2014-0062963

(51) Int. Cl.
*F16K 5/00* (2006.01)
*F16K 5/04* (2006.01)
(Continued)

(52) U.S. Cl.
CPC ............ *F16K 5/0464* (2013.01); *B60K 15/01* (2013.01); *F01L 33/02* (2013.01); *F16K 3/22* (2013.01);
(Continued)

(58) Field of Classification Search
CPC . F16K 5/00; F16K 5/04; F16K 5/0457; F16K 5/0471; F16K 25/00; F16K 25/005;
(Continued)

(56) References Cited

U.S. PATENT DOCUMENTS 2,191,232 A * 2/1940 Heinen .................. F16K 5/207
251/174
3,204,924 A * 9/1965 Bredtschneider ..... F16K 3/0236
251/172
(Continued)

FOREIGN PATENT DOCUMENTS

CN    101813201    8/2010
DE    2054045 A1   5/1972
(Continued)

OTHER PUBLICATIONS

European Patent Office, Communication dated Aug. 22, 2017, issued in counterpart European application No. 14814685.5.
(Continued)

*Primary Examiner* — Mary McManmon
*Assistant Examiner* — Hailey K Do
(74) *Attorney, Agent, or Firm* — Sughrue Mion, PLLC

(57) ABSTRACT

Disclosed herein is a valve apparatus for vehicles that is configured such that the sealability of a valve body can be markedly enhanced. The valve apparatus includes a valve body, a valve member and a sealing unit. The valve body is provided with at least two ports and has an internal space communicating with the ports. The valve member is rotatably installed in the internal space so as to open or close the
(Continued)

ports. The sealing unit is provided to seal at least one of the ports. The sealing unit includes a sealing body airtightly installed on an inner surface of the corresponding port, and at least one elastic element integrally provided on a first end of the sealing body. The elastic element axially applies elastic force to the sealing body so that a second end of the sealing body comes into airtight contact with the valve member.

3 Claims, 7 Drawing Sheets

(51) Int. Cl.
    *F16K 3/22*       (2006.01)
    *F16K 3/24*       (2006.01)
    *B60K 15/01*     (2006.01)
    *F01L 33/02*     (2006.01)

(52) U.S. Cl.
    CPC ................ *F16K 3/24* (2013.01); *F16K 3/243* (2013.01); *F16K 5/00* (2013.01); *F16K 5/0457* (2013.01); *F16K 5/0471* (2013.01)

(58) Field of Classification Search
    CPC ... F16K 3/22; F16K 3/24; F16K 3/243; F16K 27/065; Y10T 137/0508; Y10T 137/0514; Y10T 137/0519
    USPC ....... 251/359, 360, 362, 363, 365, 192, 208, 251/209, 283, 309–312
    See application file for complete search history.

(56) References Cited

U.S. PATENT DOCUMENTS

| | | | | |
|---|---|---|---|---|
| 3,218,024 A | * | 11/1965 | Kroekel | F16K 31/1635 251/172 |
| 4,552,335 A | * | 11/1985 | Alexander | F16K 5/0673 251/315.05 |
| 4,568,062 A | * | 2/1986 | Regitz | F16K 3/0236 137/72 |
| 5,088,687 A | * | 2/1992 | Stender | F16K 5/0668 251/174 |
| 5,145,150 A | * | 9/1992 | Brooks | F16K 5/202 251/188 |
| 5,467,966 A | * | 11/1995 | Nicholson | F16K 3/0227 251/174 |
| 8,403,296 B2 | * | 3/2013 | Phillips | F16J 15/025 251/171 |
| 2001/0025941 A1 | * | 10/2001 | Smith, Jr. | F16K 5/0657 251/174 |
| 2005/0258386 A1 | | 11/2005 | Wang | |
| 2013/0168591 A1 | * | 7/2013 | Webster | F16K 3/0236 251/328 |
| 2014/0090414 A1 | * | 4/2014 | McLane | F16K 11/0853 62/510 |
| 2014/0319395 A1 | * | 10/2014 | Warbey | F16K 5/0678 251/185 |

FOREIGN PATENT DOCUMENTS

| | | |
|---|---|---|
| DE | 2444716 A1 | 4/1976 |
| JP | 9-217849 | 8/1997 |
| KR | 20-1999-0041768 | 12/1999 |
| KR | 10-0784407 | 11/2005 |
| KR | 10-2011-0128788 | 11/2011 |

OTHER PUBLICATIONS

International Patent Office, International Search Report dated Feb. 17, 2015 by the International Patent Office in International Application No. PCT/KR2014/005886.

Korean Patent Office, Communication dated Apr. 20, 2015 by the Korean Patent Office in copending Korean Application No. 10-2014-0062963.

* cited by examiner

[Fig. 1]
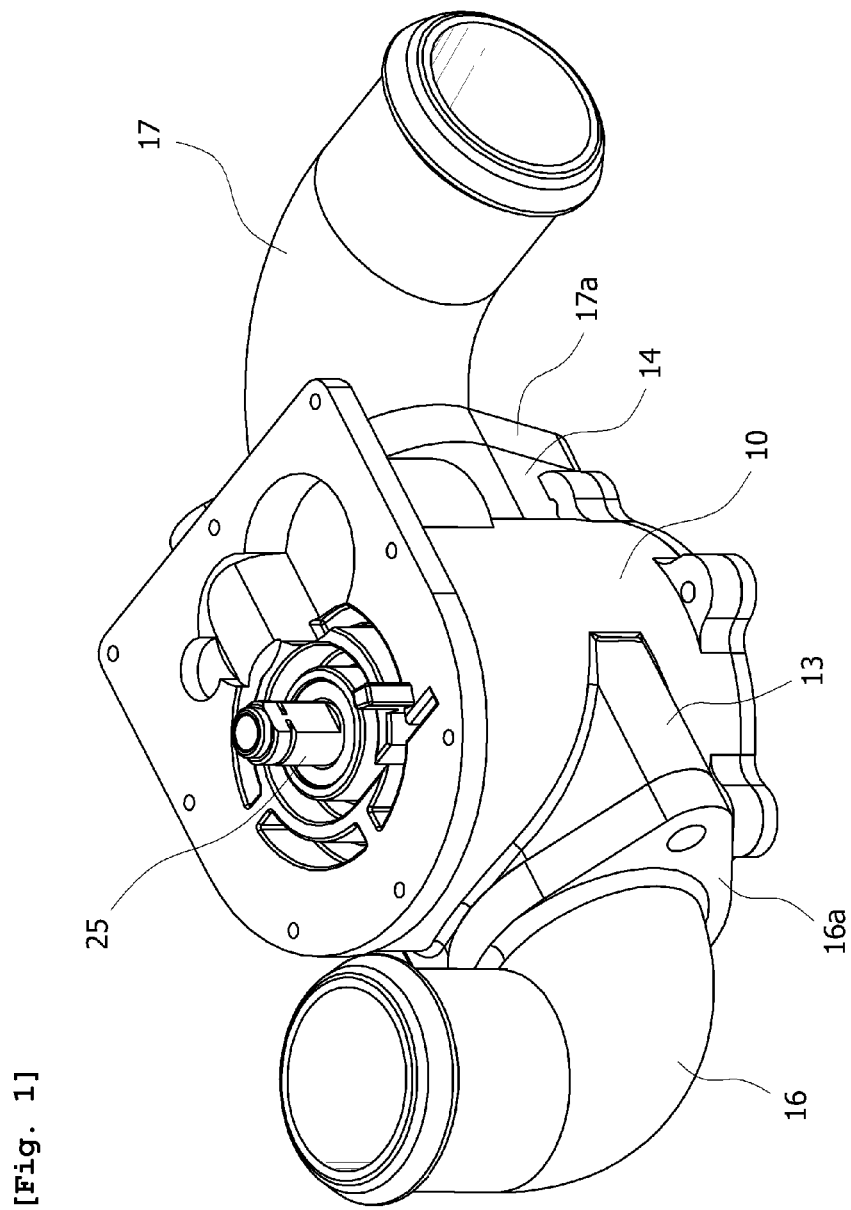

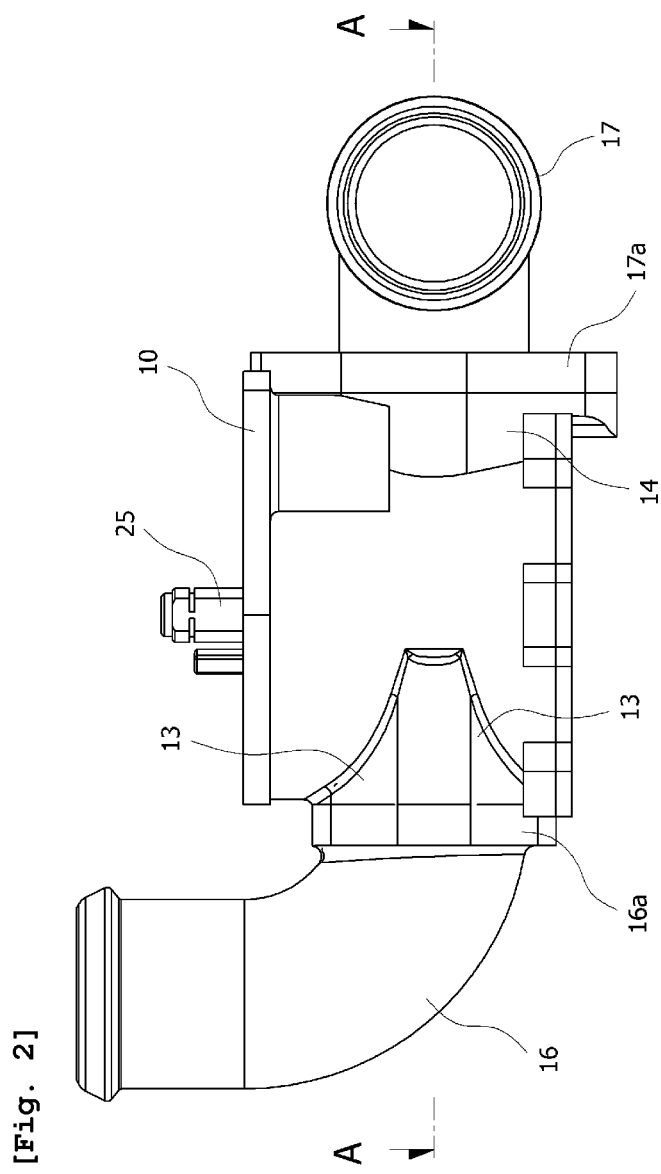
[Fig. 2]

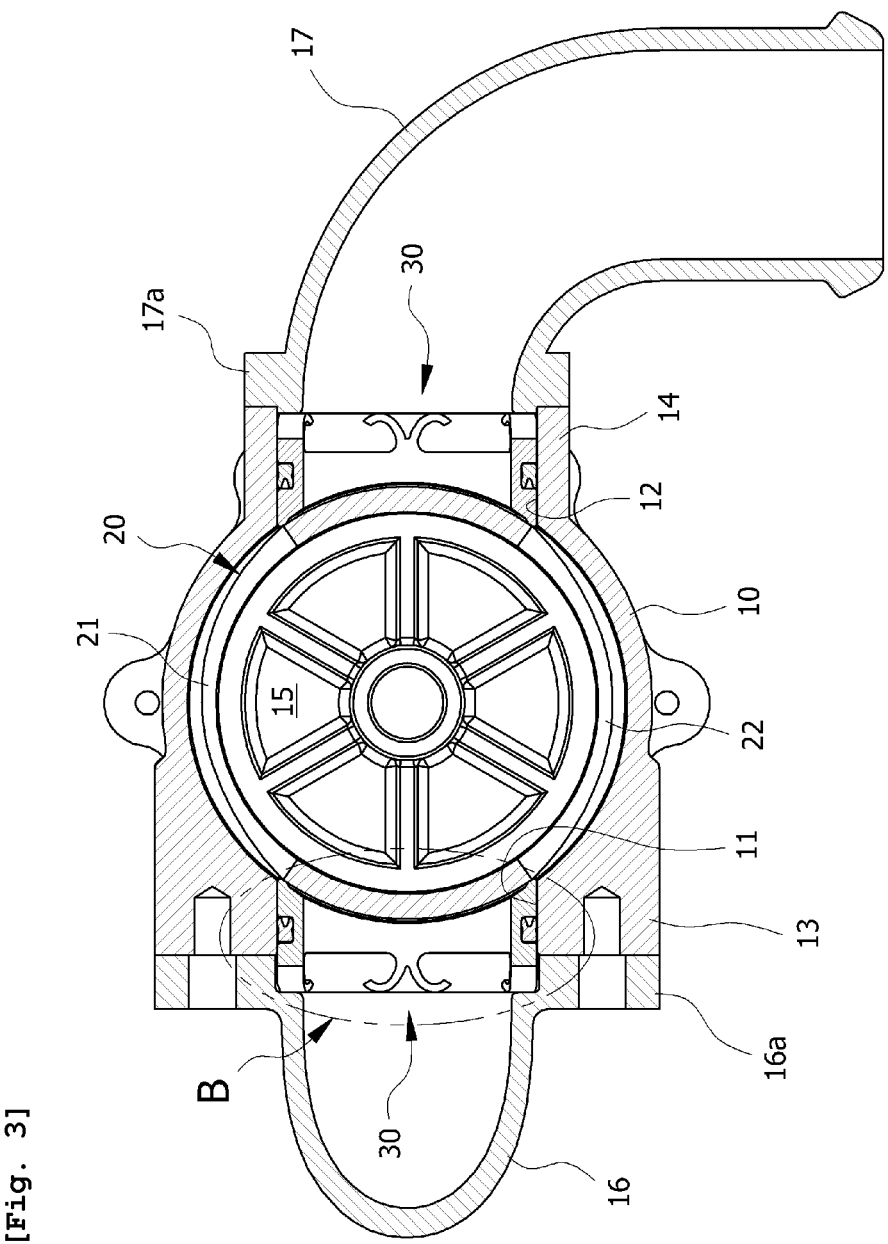
[Fig. 3]

[Fig. 4]
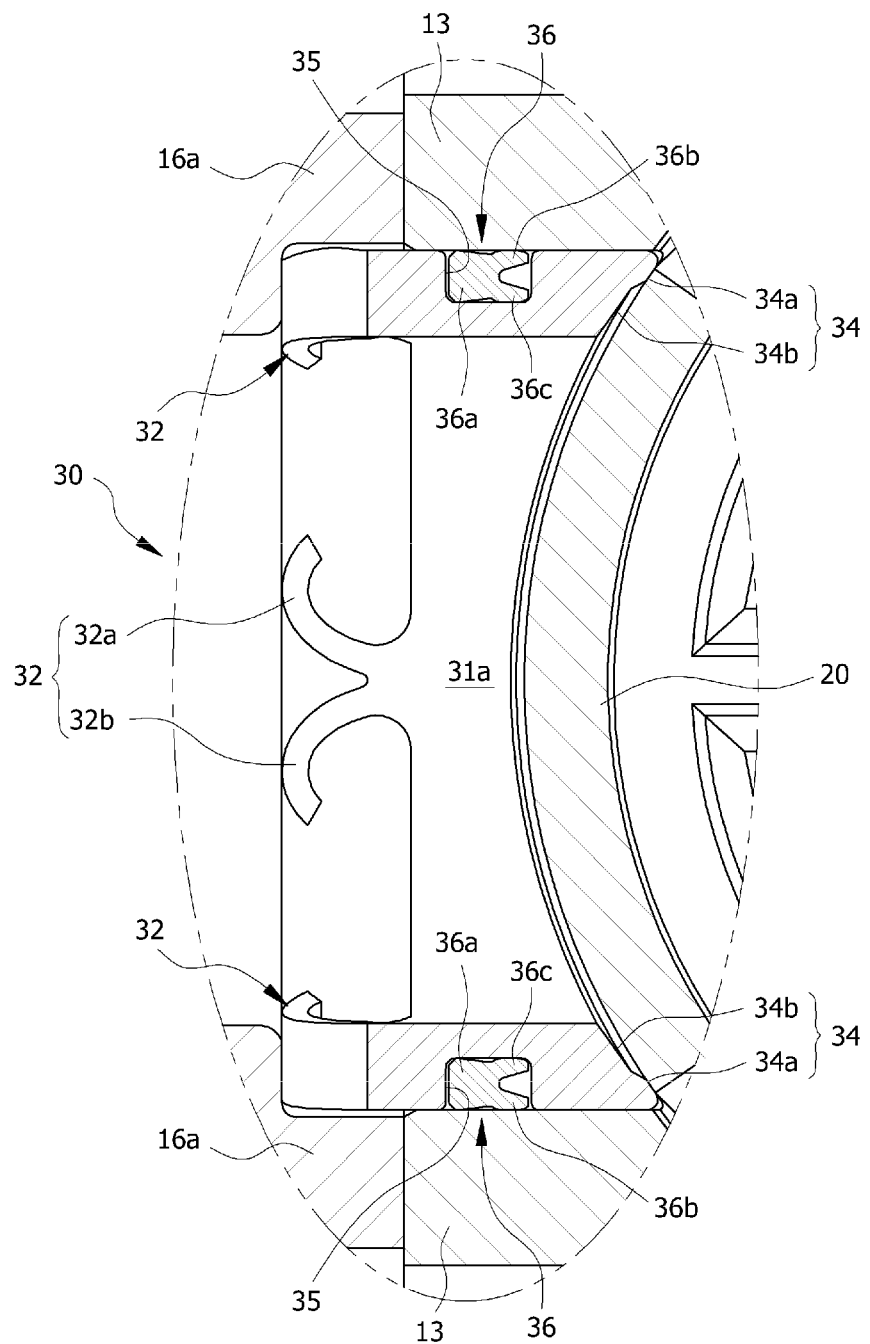

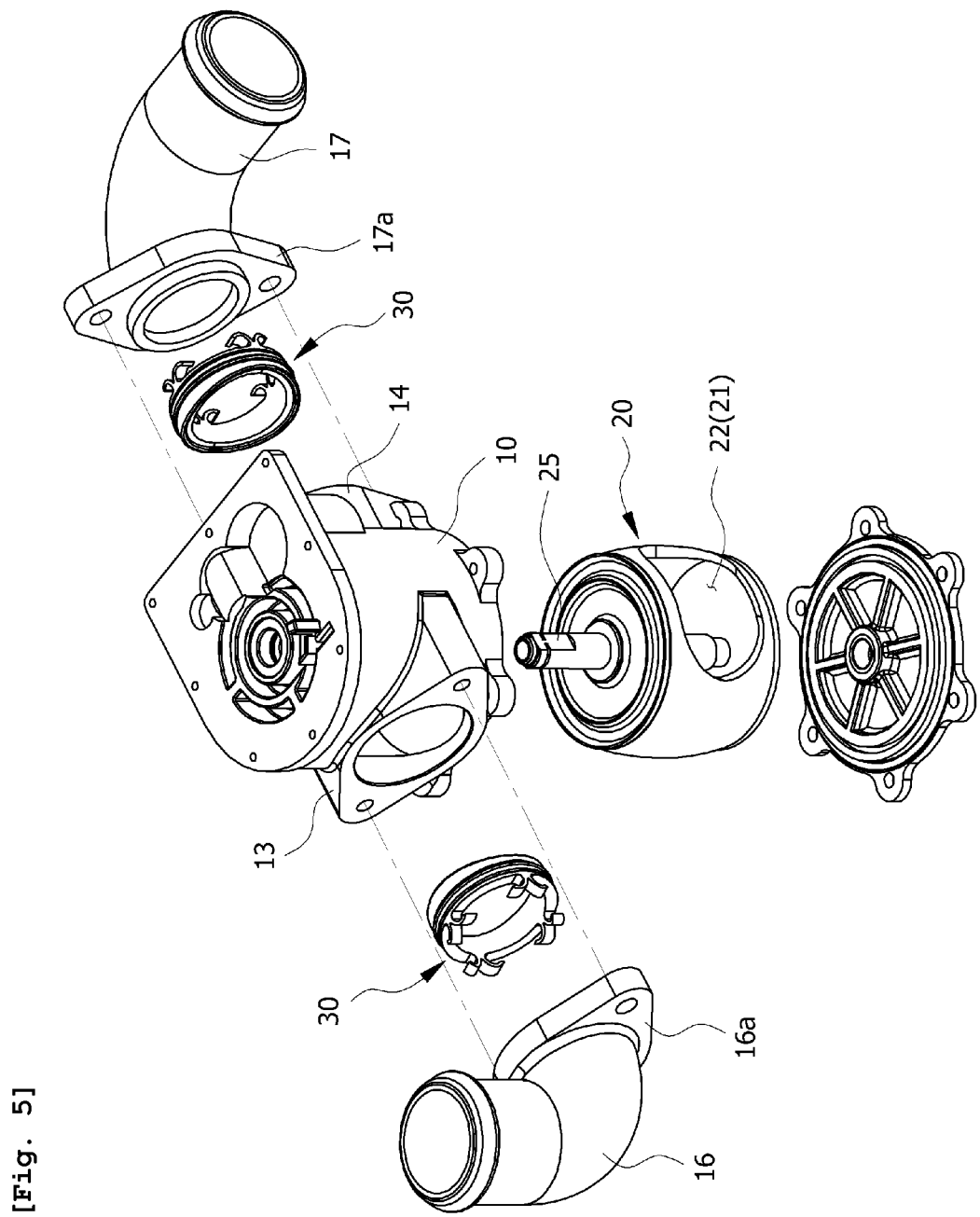
[Fig. 5]

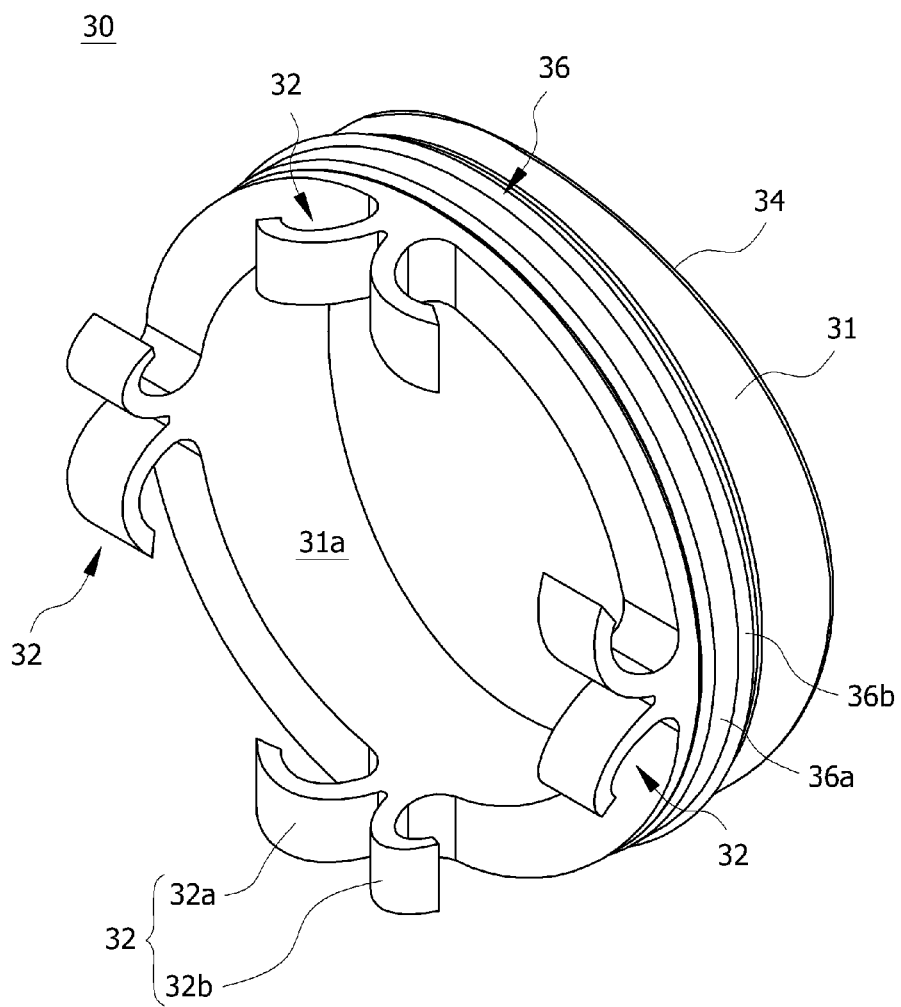
[Fig. 6]

[Fig. 7]
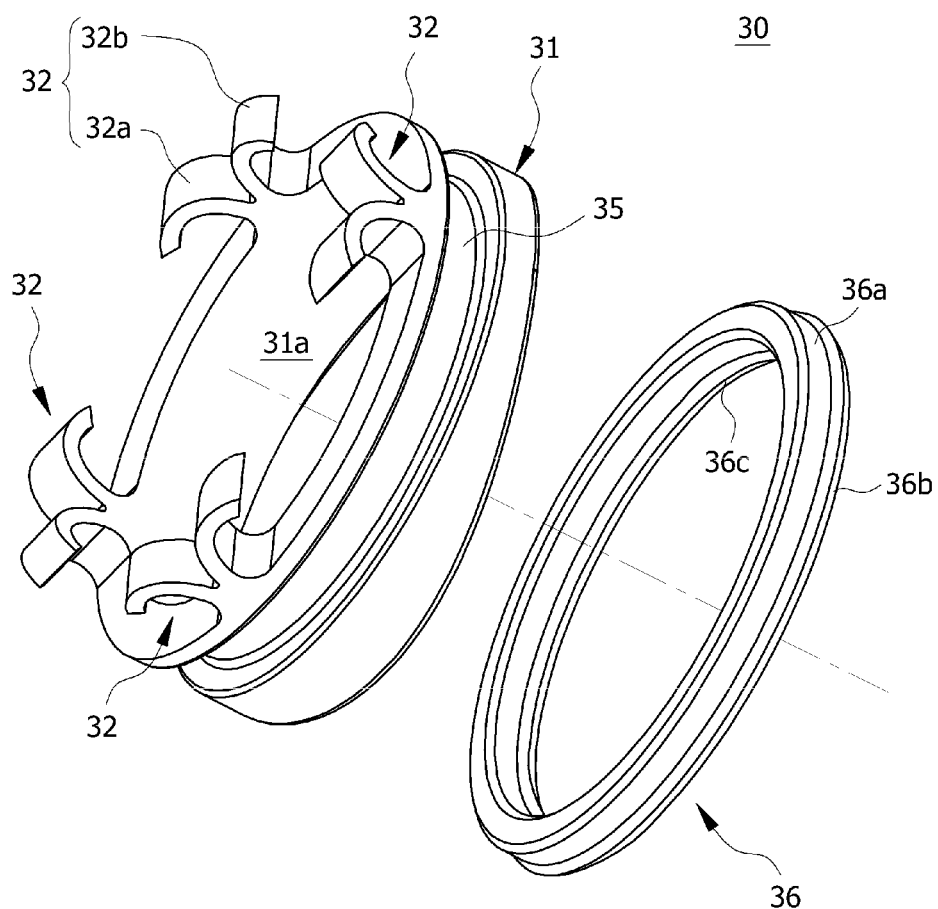

VALVE APPARATUS FOR VEHICLE

TECHNICAL FIELD

The present invention generally relates to valve apparatuses for vehicles that are used for purposes of controlling circulation or flow of fluid in the vehicles. More particularly, the present invention relates to a valve apparatus for vehicles that is configured such that sealability of a port of a valve body can be markedly enhanced.

BACKGROUND ART

Generally, vehicles are provided with a variety of valve apparatuses. Such valve devices are configured to distribute or control the flow of different kinds of fluids that are provided depending on the purposes, such as cooling an engine, air conditioning of a passenger compartment, exhaust gas recirculation (of an EGR system), etc.

Of a variety of valve apparatuses, rotary valves include: a valve body having two or more ports; and a valve member configured to be rotated around a rotating shaft in the valve body so as to selectively open or close the two or more ports. Such rotary valves are mainly used in coolant circulation circuits of internal combustion engines.

A representative example of such rotary valves was proposed in U.S. Pat. No. 6,315,267 B1 (hereinafter, referred to as 'Patent document 1'). The rotary valve according to this conventional technique includes: a valve body having a valve chamber with an inlet port and outlet port, each communicating with the valve chamber; a cylindrical valve member disposed in the valve chamber so as to be rotatable between an open and closed position; a resilient seal member that has a curved shape and is disposed between the valve member and either the inlet port or the outlet port; a torque motor attached to the valve body so as to rotate the valve member; and a spring means for elastically biasing a rotor of the torque motor and the valve member to the open position.

In the rotary valve according to the conventional technique, when the inlet port or the outlet port of the valve body is opened by rotation of the valve member, the resilient seal member is elastically interposed between the valve member and the corresponding portion of the valve body, thus preventing fluid from leaking through the inlet port or the outlet port.

However, the conventional rotary valve is disadvantageous in that the sealability of the inlet or outlet port of the valve body is comparatively low because of insufficient resilience of the resilient seal member, and leakage of fluid cannot be reliably prevented.

DISCLOSURE

Technical Problem

Accordingly, the present invention has been made keeping in mind the above problems occurring in the prior art, and an object of the present invention is to provide a valve apparatus for vehicles that is configured such that the outer surface of a valve member is elastically compressed on an inner surface of any one of the ports of a valve body, whereby the sealability of the corresponding port can be reliably ensured, and leakage of fluid can be reliably prevented.

Technical Solution

In order to accomplish the above object, the present invention provides a valve apparatus for a vehicle, including: a valve body provided on an outer surface thereof with at least two ports, the valve body having therein an internal space communicating with the ports; a valve member rotatably installed in the internal space of the valve body, the valve member opening or closing the ports; and a sealing unit provided to seal at least one of the ports, wherein the sealing unit comprises a sealing body airtightly installed on an inner surface of the corresponding port, and at least one elastic element integrally provided on a first end of the sealing body, the elastic element axially applying elastic force to the sealing body so that a second end of the sealing body comes into airtight contact with an outer surface of the valve member.

The elastic member may include a pair of C-shaped elastic parts symmetrically connected to each other. The C-shaped elastic parts may be integrally provided on the first end of the sealing body.

The sealing body may have on the second end thereof a sealing surface coming into close contact with the outer surface of the valve member. The sealing surface may include a first close contact surface having a curved shape corresponding to a curved outer surface of the valve member, and a second close contact surface formed in a stepped shape inside the first close contact surface.

An annular groove may be formed in an outer surface of the sealing body, and an annular lip seal may be installed in the annular groove. The annular lip seal may include an annular fitting body fitted into the annular groove and brought into close contact with an inner surface of the annular groove, and first and second lip parts extending from respective opposite sides of the annular fitting body so as to be capable of being elastically changed in shape. The first lip part may be brought into close contact with a bottom of the annular groove, and the second lip part may be brought into close contact with the inner surface of the corresponding port.

Advantageous Effects

In the present invention, the elastic force of an elastic element in any one of the ports of a valve body biases a sealing body toward the outer surface of a valve member so that a sealing surface of the sealing body can be reliably maintained in close contact with the outer surface of the valve member. The sealability of the port can be reliably ensured, and leakage of fluid can be reliably prevented.

Particularly, in the present invention, the elastic element is integrally provided with the sealing body so that the elastic force of the elastic element applied to the sealing body can be further increased, whereby the sealability of the sealing body 31 can be further enhanced.

Furthermore, the elastic element comprises a pair of C-shaped elastic parts symmetrically connected to each other. Therefore, the elastic force applied from the sealing body to the outer surface of the valve member can be further increased.

The sealing surface includes a first close contact surface and a second close contact surface that form a stepped structure. Thus, an entire contact area of the sealing surface is comparatively reduced, whereby abrasion of the sealing body 31 can be markedly reduced during a dynamic friction process. In addition, the sealing surface is flexibly changed in shape because of the stepped structure of the sealing surface. Thereby, the first close contact surface and the second close contact surface of the sealing surface can come into closer contact with the outer surface of the valve member. Consequently, the sealability on the sealing surface can be markedly enhanced.

Moreover, an annular lip seal is installed on the outer surface of the sealing body. Therefore, the sealability between the outer surface of the sealing body and the inner surface of the port can reliably ensured with respect to the circumferential direction and/or the radial direction.

Particularly, first and second lip parts that can be elastically changed in shape are formed on respective opposite sides of a fitting body of the lip seal. Thus, when the fitting body of the lip seal is inserted into the annular groove, the first lip part is elastically changed in shape so that the fitting body is pushed toward the outer diameter of the annular groove, and the end of the second lip part can more airtightly make contact with the inner surface of the port.

DESCRIPTION OF DRAWINGS

FIG. 1 is a perspective view illustrating a valve apparatus for a vehicle according to an embodiment of the present invention;

FIG. 2 is a side view illustrating the valve apparatus according to the embodiment of the present invention;

FIG. 3 is a sectional view taken along line A-A of FIG. 2;

FIG. 4 is an enlarged view showing a portion designated by the arrow B of FIG. 3;

FIG. 5 is an exploded perspective view showing the valve apparatus according to the embodiment of the present invention;

FIG. 6 is a perspective view showing a sealing unit of the valve apparatus according to the embodiment of the present invention; and FIG. 7 is an exploded perspective view showing the sealing unit of the valve apparatus according to the embodiment of the present invention.

BEST MODE

Hereinafter, an embodiment of the present invention will be described in detail with reference to the attached drawings. For reference, the size of each element, the thickness of lines illustrating the element, etc. may be exaggeratedly expressed in the drawings for the sake of understanding the present invention. The terms and words used for elements in the description of the present invention have been determined in consideration of the functions of the elements in the present invention. The terms and words may be changed depending on the intention or custom of users or operators, so that they must be defined based on the whole content of the specification of the present invention.

FIGS. 1 through 5 illustrate a valve apparatus for a vehicle according to an embodiment of the present invention.

As shown in FIGS. 1 through 3, the valve apparatus according to the present invention includes: a valve body 10 having two or more ports 11 and 12; a valve member 20 rotatably installed in the valve body 10; and at least one sealing unit 30 installed in at least one of the ports 11 and 12 of the valve body 10.

As shown in FIG. 3, the valve body 10 has in an outer surface thereof the two or more ports 11 and 12 through which fluid is drawn into or discharged from the valve body 10. Furthermore, the valve body 10 has therein an internal space 15 communicating with the ports 11 and 12. In FIGS. 1 and 2, although the two inlet ports 11 and 12 have been illustrated as being formed in the valve body 10, the present invention is not limited to this. That is, the number of ports, the positions thereof, etc. can be modified in a variety of ways.

As shown in FIGS. 1 through 3, two or more flanges 13 and 14 protrude from the outer surface of the valve body 10. As shown in FIG. 3, the ports 11 and 12 are respectively formed in the flanges 13 and 14. Flanges 16a and 17a of port fittings 16 and 17, each of which has a pipe or tube shape, are respectively coupled to the flanges 13 and 14 of the valve body 10.

The valve member 20 is rotatably installed in the internal space 15 of the valve body 10 by a valve shaft 25. An upper end of the valve shaft 25 passes through and protrudes upward from an upper surface of the valve body 10. A drive motor, a powered element, or the like is connected to the protruding upper end of the valve shaft 25 so that the valve member 20 can be rotated by the drive force of the drive motor, the powered element, or the like.

As shown in FIGS. 3 and 5, one or more openings 21 and 22 are formed in an outer surface of the valve member 20. The outer surface of the valve member 20 is curved. The valve shaft 25 is installed in a central portion of the valve member 20. As the valve member 20 is rotated by the valve shaft 25, each of the openings 21 and 22 of the valve member 20 selectively communicates with the corresponding one of the ports 11 and 12 of the valve body 10 so that each port 11, 12 of the valve body 10 can be selectively opened or closed.

The sealing unit 30 is installed in at least one of the ports 11 and 12 of the valve body 10. The sealability of the one or more ports 11 and 12 can be ensured by the sealing unit 30.

The sealing unit 30 includes a sealing body 31 airtightly installed on an inner surface of the port 11 or 12, and at least one elastic element 32 integrally provided on a first end of the sealing body 31.

The sealing body 31 has a cylindrical structure that has therein a hollow space 31a, through which fluid flows, and an outer surface corresponding to the inner surface of the port 11 or 12. Thereby, the outer surface of the sealing body 31 can come into airtight contact with the inner surface of the port 11 or 12.

The sealing body 31 has the at least one elastic element 32 integrally formed on the first end thereof, and a sealing surface 34 coming into airtight contact with the outer surface of the valve member 20.

The elastic element 32 is integrally provided on the first end of the sealing body 31 to form a single body with the sealing body 31. The elastic element 32 axially applies elastic force to the sealing body 31 so that the sealing surface 34 of the sealing body 31 can be reliably maintained in close contact with the outer surface of the valve member 20.

Particularly, in this embodiment of the present invention, one or more elastic elements 32 are integrally provided with the sealing body 31 so that the elastic force of the elastic element 32 to compress the sealing body 31 can be further increased, whereby the sealability of the sealing body 31 can be further enhanced.

The elastic element 32 may be made of the same material as that of the sealing body 31, and the elastic element 32 and the sealing body 31 may be formed into a single body by injection molding. Alternatively, the elastic element 32 may be made of highly-elastic material differing from the material of the sealing body 31, and they may be formed into a single body by double injection molding.

Particularly, in this embodiment, the elastic elements 32 are provided on the first end of the sealing body 31 and arranged in the circumferential direction at positions spaced apart from each other so that the elastic force of the elastic elements 32 applied to the sealing body 31 can be further increased.

Each elastic element 32 may include a pair of C-shaped elastic parts 32a and 32b that form a successive and symmetrical structure and are integrally formed on the first end of the sealing body 31. As such, by virtue of the symmetrically successive structure of the two C-shaped elastic parts 32a and 32b, the elastic force applied from the sealing body 31 to the outer surface of the valve member 20 can be further increased.

The sealing body 31 has on a second end thereof the annular sealing surface 34 that comes into close contact with the outer surface of the valve member 20. The sealing surface 34 includes a first close contact surface 34a having a curved shape corresponding to the curved outer surface of the valve member 20, and a second close contact surface 34b that is formed in a stepped shape inside the first close contact surface 34a.

In an initial stage of a valve apparatus installation process, the first close contact surface 34a of the sealing surface 34 comes into contact with the outer surface of the valve member 20 so that an entire contact area of the sealing surface 34 is comparatively reduced, whereby abrasion of the sealing body 31 can be markedly reduced during a dynamic friction process. After a predetermined period of time has passed after the installation process, the sealing surface 34 is flexibly changed in shape because of the stepped structure of the first close contact surface 34a and the second close contact surface 34b of the sealing surface 34. Thereby, the first close contact surface 34a and the second close contact surface 34b of the sealing surface 34 can come into closer contact with the outer surface of the valve member 20. Consequently, the sealability on the sealing surface 34 can be markedly enhanced.

The sealing body 31 is made of material such as polytetrafluoroethylene (PTFE) having a comparatively low friction coefficient and superior chemical resistance. As such, because the sealing body 31 is made of material having a low friction coefficient, a dynamic friction load between the outer surface of the valve member 20 and the sealing body 31 can be reduced when the valve member 20 rotates relative to the sealing body 31 while making contact with the sealing body 31. Hence, abrasion of the sealing body 31 can be markedly reduced.

An annular groove 35 is formed in the outer surface of the sealing body 30, and a lip seal 36 is installed in the annular groove 35. The lip seal 36 includes an annular fitting body 36a that is fitted into the annular groove 35 and is brought into close contact with the inner surface of the annular groove 35, and first and second lip parts 36b and 36c that extend outward from the annular fitting body 36a so as to be capable of being changed in shape.

The lip seal 36 is made of material such as ethylene propylene diene monomer (EPDM) that can be elastically changed in shape so as to further enhance the sealability of the sealing unit.

Due to the above-mentioned structure of the lip seal 36, when the annular fitting body 36a is inserted into the annular groove 38, the first lip part 36b elastically changes in shape in such a way that the end thereof comes into airtight contact with the inner surface of the port 11 or 12.

Furthermore, when the annular fitting body 36a is inserted into the annular groove 35, the second lip part 36c is elastically changed in shape by the bottom of the annular groove 35 so that the annular fitting body 36a can be elastically biased toward the outer diameter of the annular groove 35. Thereby, the end of the first lip part 36b can more airtightly make contact with the inner surface of the port 11 or 12.

Although the embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A valve apparatus for a vehicle, comprising:
a valve body provided on an outer surface thereof with at least two ports, the valve body having therein an internal space communicating with the ports;
a valve member rotatably installed in the internal space of the valve body, the valve member opening or closing the ports; and
a sealing unit provided to seal at least one of the ports,
wherein the sealing unit comprises a sealing body airtightly installed on an inner surface of the corresponding port, and at least one elastic element integrally provided on a first end of the sealing body, the elastic element axially applying elastic force to the sealing body so that a second end of the sealing body comes into airtight contact with an outer surface of the valve member,
the elastic element comprises a pair of C-shaped elastic parts symmetrically connected to each other, the C-shaped elastic parts being integrally provided on the first end of the sealing body,
each of the C-shaped elastic parts of the elastic element has a C-type structure whose one side is open,
the C-shaped elastic parts formed in a pair are symmetrically connected to each other such that the open side of one of the C-shaped part and the open side of the other C-shaped part are opposite to each other, and
each elastic element is paired with the C-shaped elastic parts formed in a pair, a plurality of pairs of C-shaped elastic parts being integrally provided on the first end of the sealing body as a single body along a circumferential direction of the sealing body, and the elastic elements are spaced apart from each other.

2. The valve apparatus of claim 1, wherein the sealing body has on the second end thereof a sealing surface coming into close contact with the outer surface of the valve member, the sealing surface comprising a first close contact surface having a curved shape corresponding to a curved outer surface of the valve member, and a second close contact surface formed in a stepped shape inside the first close contact surface.

3. The valve apparatus of claim 1, wherein an annular groove is formed in an outer surface of the sealing body, and an annular lip seal is installed in the annular groove,
wherein the annular lip seal comprises an annular fitting body fitted into the annular groove and brought into close contact with an inner surface of the annular groove, and first and second lip parts extending from respective opposite sides of the annular fitting body so as to be capable of being elastically changed in shape, wherein the first lip part is brought into close contact with a bottom of the annular groove, and the second lip part is brought into close contact with the inner surface of the corresponding port.

* * * * *